(12) United States Patent
Henise, IV et al.

(10) Patent No.: US 9,122,471 B2
(45) Date of Patent: Sep. 1, 2015

(54) IDENTIFICATION OF POWER SOURCE ELECTRICAL CONNECTIVITY

(71) Applicant: International Business Machines Corporation, Armonk, NY (US)

(72) Inventors: John A. Henise, IV, Silver Spring, MD (US); William M. Megarity, Raleigh, NC (US); Luke D. Remis, Raleigh, NC (US); Gregory D. Sellman, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 355 days.

(21) Appl. No.: 13/707,970

(22) Filed: Dec. 7, 2012

(65) Prior Publication Data

US 2014/0164814 A1    Jun. 12, 2014

(51) Int. Cl.
| | | |
|---|---|---|
| *G06F 1/26* | (2006.01) | |
| *G06F 1/32* | (2006.01) | |
| *G06F 1/28* | (2006.01) | |
| *G06F 1/30* | (2006.01) | |

(52) U.S. Cl.
CPC ... *G06F 1/28* (2013.01); *G06F 1/26* (2013.01); *G06F 1/263* (2013.01); *G06F 1/266* (2013.01); *G06F 1/30* (2013.01); *G06F 1/305* (2013.01)

(58) Field of Classification Search
CPC ........... G06F 1/26; G06F 1/263; G06F 1/266; G06F 1/28; G06F 1/30; G06F 1/305
USPC .......................................... 713/300, 320, 340
See application file for complete search history.

(56) References Cited

U.S. PATENT DOCUMENTS

| | | | |
|---|---|---|---|
| 4,797,570 A * | 1/1989 | Fox | ................................. 307/87 |
| 6,031,298 A | 2/2000 | Lo et al. | |
| 6,317,346 B1 | 11/2001 | Early | |
| 6,597,073 B1 | 7/2003 | Check | |
| 7,152,174 B2 | 12/2006 | Needham et al. | |
| 7,639,048 B2 | 12/2009 | Lin | |
| 7,877,622 B2 | 1/2011 | Gruendler | |
| 8,013,592 B2 | 9/2011 | Giubbini et al. | |
| 2004/0012265 A1 | 1/2004 | Fauh et al. | |
| 2005/0200205 A1 | 9/2005 | Winn et al. | |
| 2011/0006607 A1* | 1/2011 | Kwon et al. | .................... 307/66 |
| 2011/0029788 A1 | 2/2011 | Domingo et al. | |
| 2011/0072289 A1 | 3/2011 | Kato | |
| 2011/0291478 A1 | 12/2011 | Cochran et al. | |
| 2012/0096297 A1 | 4/2012 | Archibald et al. | |
| 2012/0200161 A1 | 8/2012 | Isler, III et al. | |

* cited by examiner

*Primary Examiner* — Michael J Brown
(74) *Attorney, Agent, or Firm* — Katherine S. Brown; Jeffrey L. Streets

(57) ABSTRACT

A computer determines a characteristic corresponding to each of a first power source and a second power source. The first and second power sources are connected to one or more power distribution units and are configured to provide power in a datacenter. The characteristic includes at least one of a current, a resistance, a voltage, a frequency, a phase, and a magnetic field. The computer generates a comparison of the characteristic corresponding to the first power source and the second power source, to a threshold value of the characteristic. The computer determines if the comparison violates the threshold value of the characteristic. In response to determining the comparison does not violate the threshold value of the characteristic, the computer determines that the first power source and the second power source are connected to a given power distribution unit included in the one or more power distribution units.

18 Claims, 5 Drawing Sheets

IDENTIFICATION OF POWER SOURCE ELECTRICAL CONNECTIVITY

FIELD OF THE INVENTION

The present invention relates generally to the field of power distribution, and more particularly to the identification of properly connected power supplies.

BACKGROUND OF THE INVENTION

Power Distribution Units (PDUs) are commonly employed to distribute power to electronic devices. One environment in which PDUs are commonly used is a datacenter. A datacenter is a facility used to house electronic devices such as computing systems. These computing systems may be used for storage, application processing, and network traffic routing purposes. It is important that such systems be provided with an uninterrupted supply of power. PDUs typically draw power from a power supply circuit, containing circuit breakers, which is connected to a power feed (i.e. power from a power company's electrical grid) and then supply that power to the power supply units connected to electronic devices, such as computing systems. A power supply unit typically draws power with a particular voltage from a PDU and transforms that power into a form that is readily usable by the electronic circuitry of a given computing system.

Many large scale electronic devices such as the computing systems typically used in a datacenter are powered by multiple power supply units. A datacenter computing system typically receives power from at least two different power supply units (which can include electrical outlets) with each power supply unit receiving power from a PDU. The two power supply units powering the computing system may or may not be receiving power from the same PDU, however, having a computing system draw power through multiple PDUs, which are connected to different circuits, allows the computing system to be redundantly powered. For example, a particular computing system may be drawing power through two different PDUs, each PDU receiving power from a different circuit connected to a power feed. Supplying power with such an arrangement allows the computing system to continue receiving power in the event that one PDU or circuit is disrupted (i.e., power supply redundancy).

As the environments in which PDUs operate become more complicated, power distribution network structures also become increasingly complex. A computing system which utilizes power supply redundancy often draws power from multiple power supply units which must be installed in a specific manner. In the process of setting up a power distribution network or expanding it, human error may leave some electronic devices without a fully redundant power supply through the incorrect connection of power supply units to PDUs.

SUMMARY

Embodiments of the present invention disclose a method, computer program product, and system for identifying the electrical connectivity of power sources. A computer determines a characteristic corresponding to each of a first power source and a second power source. The first and second power sources are connected to one or more power distribution units and are configured to provide power in a datacenter. The characteristic includes at least one of a current, a resistance, a voltage, a frequency, a phase, and a magnetic field. The computer generates a comparison of the characteristic corresponding to the first power source and the second power source, to a threshold value of the characteristic. The computer determines if the comparison violates the threshold value of the characteristic. In response to determining the comparison does not violate the threshold value of the characteristic, the computer determines that the first power source and the second power source are connected to a given power distribution unit included in the one or more power distribution units.

DETAILED DESCRIPTION

Figure 1:
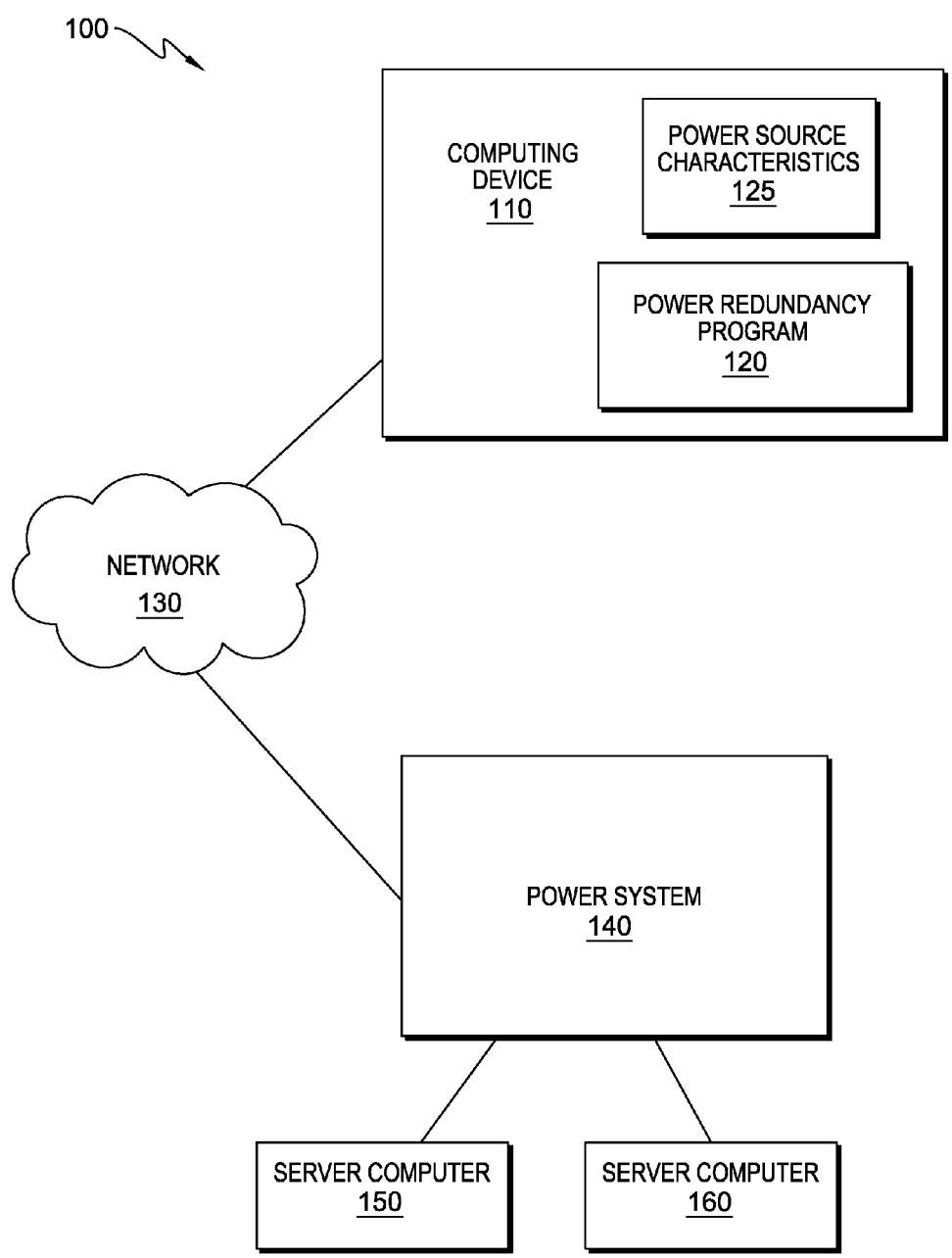
FIG. 1 is a functional block diagram illustrating a power redundancy environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 is a functional block diagram illustrating a power redundancy environment, generally designated 100, in accordance with one embodiment of the present invention. Power redundancy environment 100 includes computing device 110 and power system 140, which are interconnected over network 130. Computing device 110 includes power redundancy program 120 and power source characteristics 125.

In this exemplary embodiment, power system 140 is a power distribution system connected to server computer 150 and server computer 160. In general, the respective components included in power system 140 should be connected to, and work in concert with, one another to provide redundant electrical power for a server computer (for further details see the discussion of FIG. 2,3 below). Power system 140, in this embodiment, is connected to network 130 and acts as a communications hub for the electronic devices it powers. In other words, server computer 150 and server computer 160 can connect to network 130 and computing device 110 through power system 140. In other embodiments, server computer 150 and server computer 160 are directly connected to network 130. In general, power system 140 includes multiple power sources and functions to supply redundant power to server computer 150 and server computer 160. Power system 140 further functions to support the prevention of server computer failure due to power loss by sending characteristic power source information, such as voltage readings, to computer 110. Power system 140 includes the appropriate sensors (not shown) to measure the electrical power characteristics of the included power supplies. The sensors are integral to the power supplies included in power system 140. However, in other embodiments the sensors used to measure the power source characteristics are not integral with power system 140 and/or the passing of the characteristic power source information is accomplished through alternate methods. More specific details as to the function and arrangement of the internal components included in power system 140 will be addressed below in the discussion of FIGS. 2-4. In alternative embodiments, power system 140 can be integral to a server computer chassis.

In this exemplary embodiment, power redundancy program 120 and power source characteristics 125 are stored on computing device 110. However, in other embodiments, power redundancy program 120, and power source characteristics 125 may be stored externally and accessed through network 130. Exemplary embodiments of network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, power system 140, power redundancy program 120, and power source characteristics 125 in accordance with a desired embodiment of the present invention.

In various embodiments of the present invention, computing device 110 can be a server, a laptop computer, a personal digital assistant (PDA), a smart phone, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device, programmable electronic device, or combination of devices with access to network 130, power redundancy program 120, and power source characteristics 125 and is capable of running power redundancy program 120. Computing device 110 may include internal and external hardware components, as depicted and described in further detail with respect to FIG. 5.

In general, computing device 110 executes power redundancy program 120 to determine whether or not the power supplies of power system 140 are correctly connected to provide power source redundancy for server computers (150 and 160). Computing device 110 receives characteristic power source information from power system 140 over network 130. In an exemplary embodiment, measured characteristic power source information is sent on a regular basis by power system 140 to computing device 110 and stored as part of power source characteristics 125. In other embodiments, the characteristic power source information is sent to computing device 110 from power system 140, in response to receiving a signal from computing device 110.

In general, power source characteristics 125 includes the characteristic power source information of power system 140. The characteristic information includes the known and/or measured constants for components (e.g. the resistance value of a given power source), as well as the threshold(s) and range(s) that power redundancy program 120 uses to determine if the power supplies of power system 140 are correctly connected to provide power source redundancy for server computers 150 and 160. The threshold value(s) and/or range(s) can include minimum and/or maximum values which can be used when comparing the characteristics of one power source to the characteristics of another power source. Typically, the characteristic that is measured and used is voltage since the difference in voltages of two power sources is generally very small if they receive power from a common circuit/PDU. However, in some embodiments, the measured characteristic(s) can include voltage, current, resistance, frequency, phase, magnetic field(s), or any combination thereof.

In general, power redundancy program 120 determines the connectivity of the power supplies connected to one or more server computers by analyzing and comparing the characteristics of the electrical power flowing through the power supplies. The power supplies are included in power system 140 and may or may not be properly connected to provide redundant power for server computers 150 and 160. To provide a better understanding of properly connected (redundant) power supplies as opposed to improperly connected (non-redundant) power supplies, FIG. 2 and FIG. 3 are provided to illustrate the respective differences and similarities between redundant and non-redundant power supplies.

Figure 2:
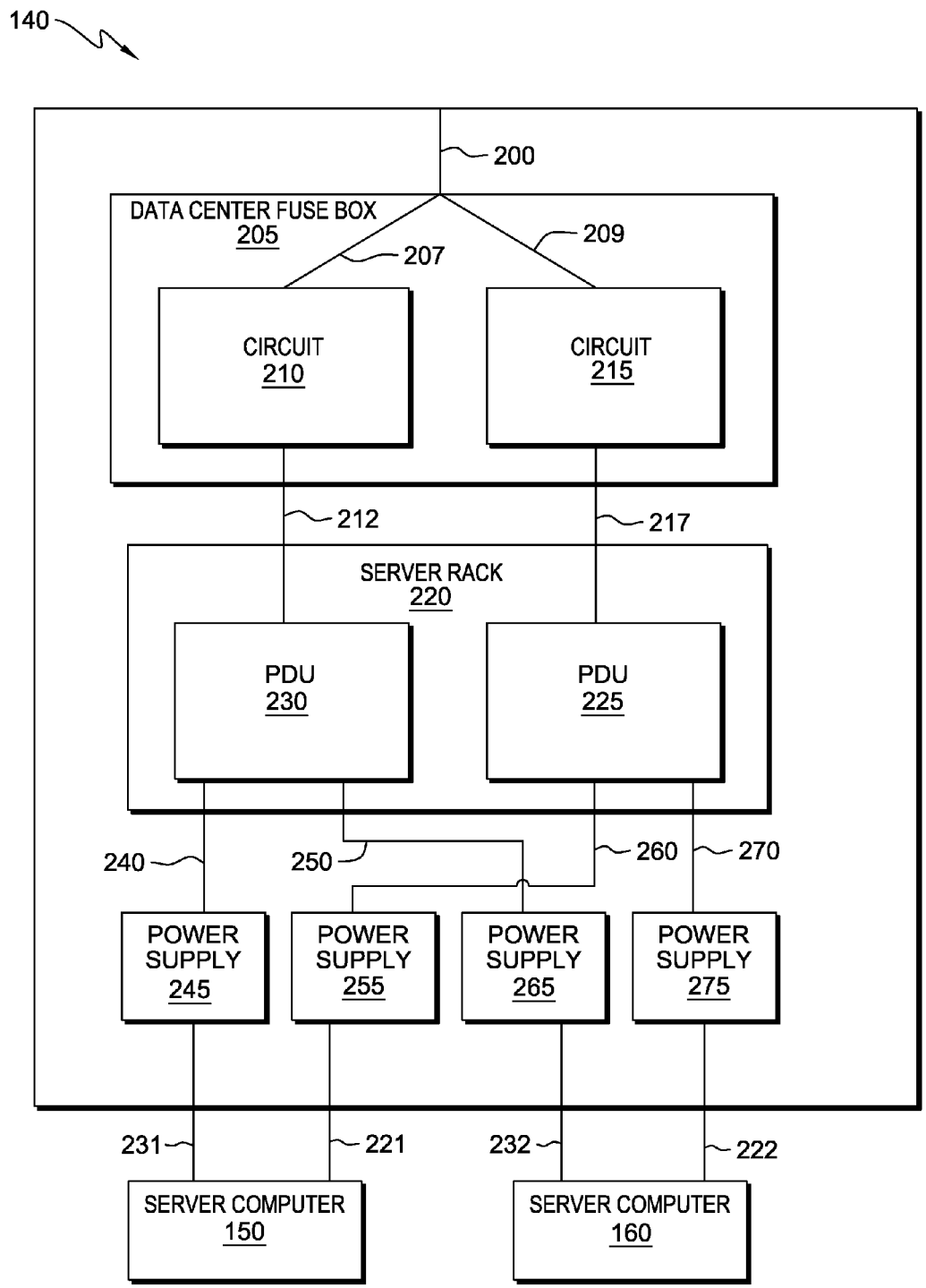
FIG. 2 is a block diagram depicting the connectivity of components included in a power system that has redundant power supplies, within the power distribution environment of FIG. 1, in accordance with an embodiment of the present invention.

FIG. 2 is a block diagram depicting the connectivity of components included in a power system 140 that has redundant power supplies, in accordance with an embodiment of the present invention.

Figure 3:
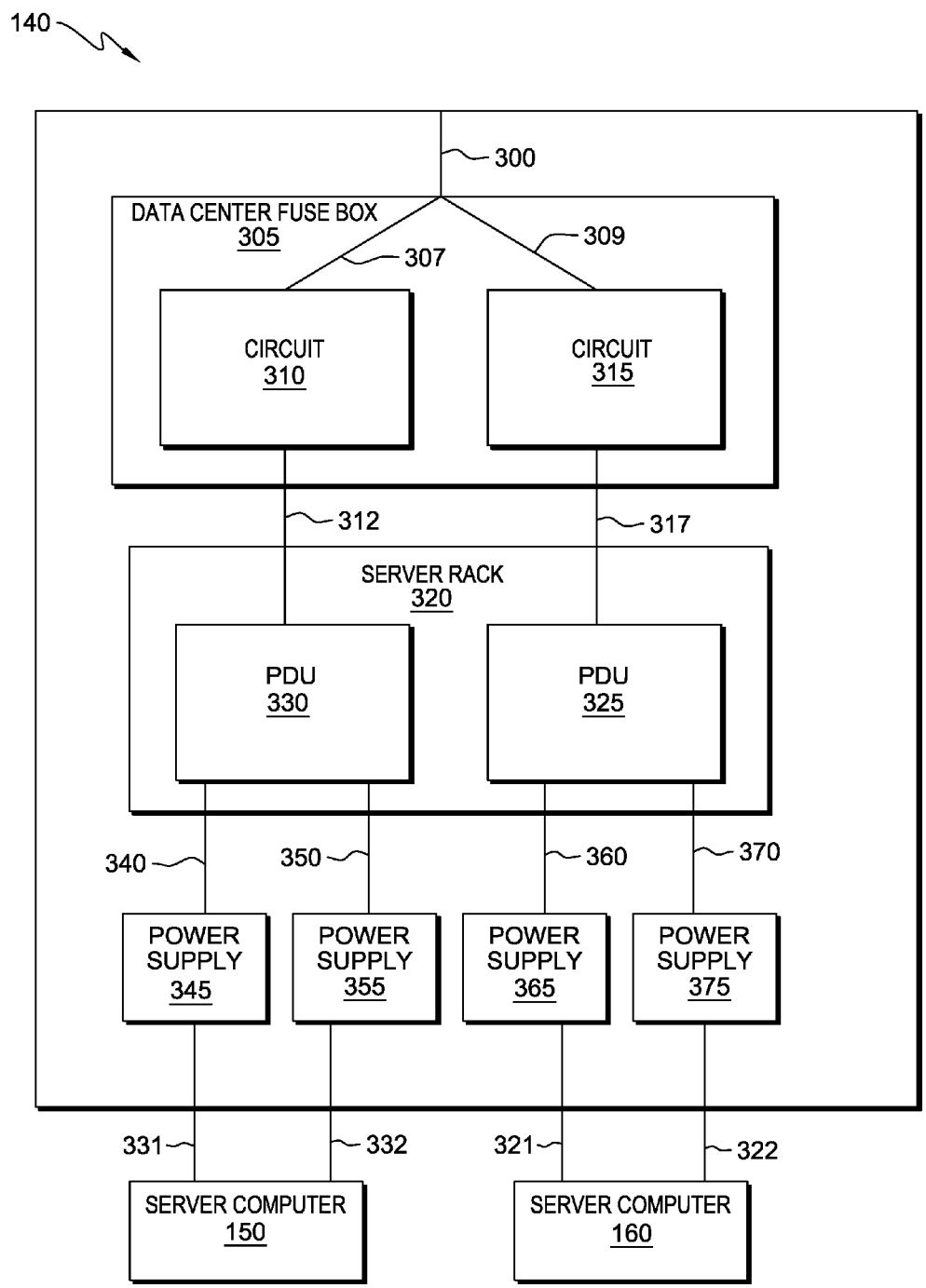
FIG. 3 is a block diagram depicting the connectivity of components included in a power system that does not have redundant power supplies, within the power distribution environment of FIG. 1, in accordance with an embodiment of the present invention.

FIG. 3 is a block diagram depicting the connectivity of components included in a power system 140 that does not have redundant power supplies, in accordance with an embodiment of the present invention.

To reduce redundancy, both FIG. 2 and FIG. 3 will be discussed simultaneously and the respective parts for each figure will be discussed, with the component from FIG. 2 preceding the discussion of the corresponding part of FIG. 3, i.e., FIG. 2 part, FIG. 3 part. The general parts and connectivity illustrated in both FIG. 2 and FIG. 3 are to be considered respectively identical unless otherwise specified.

In this exemplary embodiment, power system 140 includes a data center fuse box 205, 305 that receives power from an electrical power feed (i.e. power from a power company's electrical grid) via an electrical connection 200,300. Data center fuse box 205, 305 splits the power between circuit 210 and circuit 215, circuit 310 and circuit 315 using electrical connections 207 and 209, 307 and 309. Data center fuse box 205,305 conducts the split power to respective PDUs 230 and 225, 330 and 325 included in server rack 220,320 via electrical connections 212 and 217, 312 and 317.

In FIG. 2, PDU 230 is connected to power supply 245 and power supply 265 using electrical connections 240 and 250, respectively. PDU 225 is connected to power supply 255 and power supply 275 using electrical connections 260 and 270, respectively. Thus, power supply 245 and power supply 265 are electrically connected to circuit 210 while power supply 255 and power supply 275 are electrically connected to circuit 215.

In FIG. 3, PDU 330 is connected to power supply 345 and power supply 355 using electrical connections 340 and 350, respectively. PDU 325 is connected to power supply 365 and power supply 375 using electrical connections 360 and 370, respectively. Thus, power supply 345 and power supply 355 are electrically connected to circuit 310 while power supply 365 and power supply 375 are electrically connected to circuit 315.

Server computer 150 and server computer 160 are electrically connected to power system 140, illustrated in either FIG. 2 or FIG. 3, by only two of the available power supplies i.e., 245 and 265, or 255 and 275, 345 and 355, or 365 and 375. If a server computer is connected to two power supplies that are fed (electrically) by two different circuits/PDUs then a power failure of one circuit/PDU combinations would not result in a loss of power to the server computer. For example, in FIG. 2 server computer 150 is connected to power supply 245 and power supply 255 via electrical connections 231, 221 and server computer 160 is connected to power supply 265 and power supply 275 via electrical connections 232, 222. If circuit 210, PDU 230 and power supply 245 experience a loss of power (i.e., circuit 210 or PDU 230 is electrically dead), server computer 150 and server computer 160 would not experience a power loss since PDU 225 would continue supplying power to server computer 150 and server computer 160 via electrically live power supply 255 and power supply 275. In another example, if the power supply units connected to the server computer share a common circuit and PDU (e.g., circuit 310, PDU 330, power supply 345, and power supply 355 of FIG. 3), then the failure of either the circuit (e.g., a fuse faults in circuit 310) or the PDU (e.g., PDU 330 overloads and shuts down) would result in server computer 150 experiencing a power failure/shutdown since both power supplies 345 and 355 and the respective electrical connections 331, 332 would be electrically dead. The same result would occur for server computer 160 if either circuit 315 or PDU 325 failed. If circuit 315 or PDU 325 fail then power supplies 365 and 375 as well as electrical connections 321 and 322 would be electrically dead. Thus, server computer 160 would experience a loss of power.

In other embodiments, the number of power supply units powering a server computer can vary as well as the requirements for that server to experience a power loss. For example, a server computer is powered by four power supplies. In order to ensure power redundancy, power supplies one and two or power supplies three and four must have power. Therefore, if power supplies one and two have power but power supplies three or four do not, then the server computer will not experience a power loss. However, if power supplies one and three have power and power supplies two and four do not have power, then the server computer will experience a power loss. In yet other embodiments, one or more of the respective functions, attributes, or programs of computer 110 and power system 140 can be included in server computer 150 and server computer 160.

Figure 4:
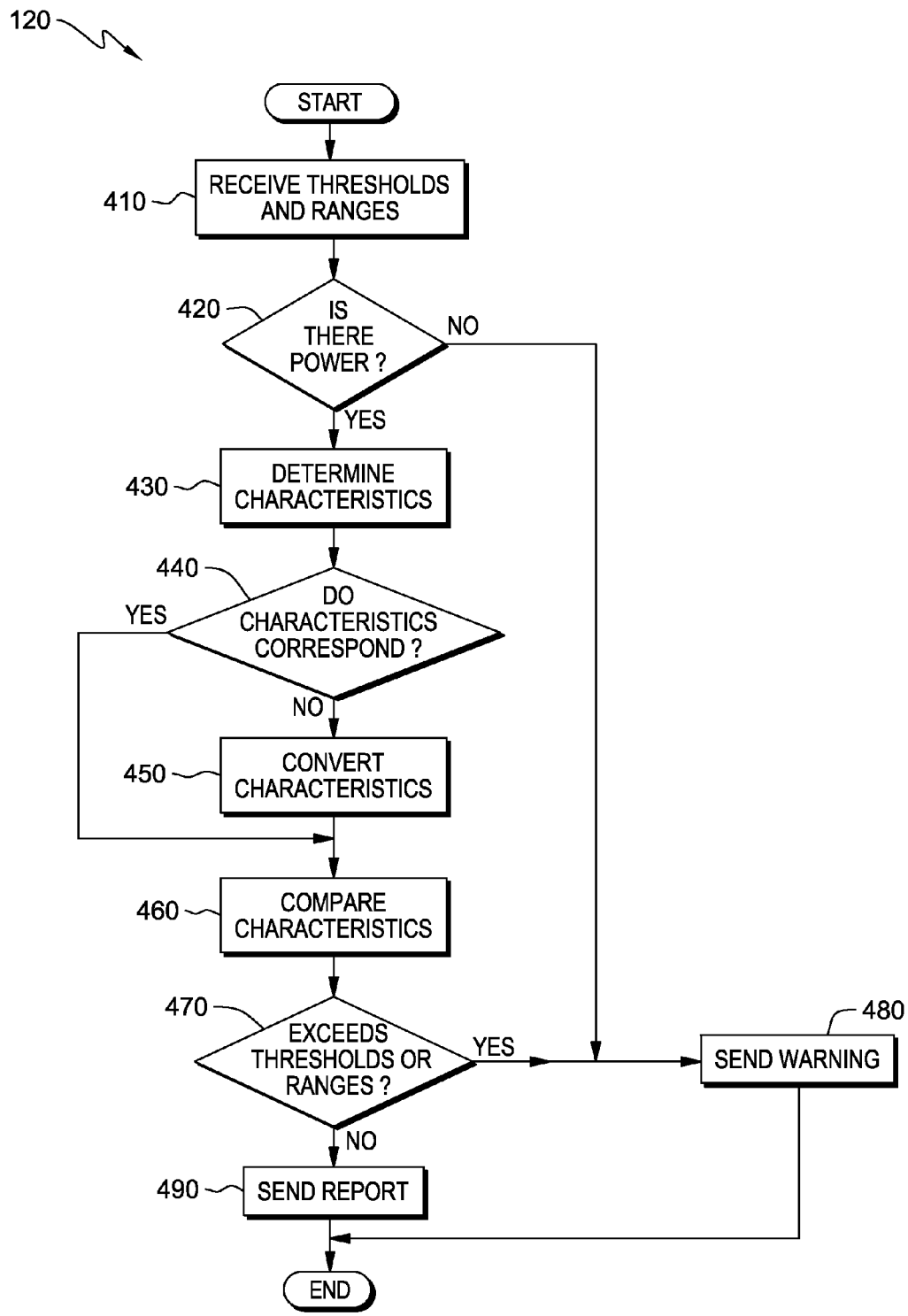
FIG. 4 illustrates operational steps of a power redundancy program, on a computing device within the power distribution environment of FIG. 1, in accordance with an embodiment of the present invention.

FIG. 4 illustrates operational steps of a power redundancy program, on a computing device within the power distribution environment of FIG. 1, in accordance with an embodiment of the present invention.

In this exemplary embodiment, power redundancy program 120 receives threshold value(s) and/or range(s) and stores them as part of power source characteristics 125 (step 410). The received threshold value(s) and/or range(s) correspond to the power source characteristic(s) that will be measured and/or correspond to a unit of measure that will be used for a comparison involving one or more converted power source characteristics. The conversion of power source characteristics will be explained in greater detail in the discussion of step 450, below.

Power redundancy program 120 determines if there is power (electrical) flowing to the power sources included in power system 140 (decision step 420) by accessing and analyzing the received characteristic(s) that were stored as part of power source characteristics 125. For example, if a received characteristic includes a voltage measurement of 0.00 volts for a given power source, then power redundancy program 120 responds by determining that there is no power flowing to that power source. If one or more of the power sources lacks power, then power redundancy program 120 sends a warning message indicating that there is not adequate power redundancy (step 480). In other embodiments, the warning message can include additional information such as information identifying the power source without power. If the power sources have power, then power redundancy program 120 accesses power source characteristics 125 and identifies which characteristics have been measured (step 430).

Power redundancy program 120 determines if the received characteristics of the individual power sources included in power system 140 correspond to one another, i.e., they have the same unit of measure (step 440). For example, if the measured characteristic of a first power source is voltage but the measured characteristic of a second power source is amperage, then the characteristics would not correspond to one another since they have different units of measure. In another example, the measured characteristic of the first and second power source is phase; therefore the characteristics do correspond to one another. If the measured characteristics have corresponding units of measure, then power redundancy program 120 compares the characteristics using the received threshold(s) and/or range(s) (step 460). If the measured characteristics do not correspond, then power redundancy program 120 converts one or both characteristics to a unit of measure such that the characteristics have corresponding units of measure (step 450), thereby facilitating a comparison of the characteristics. For example, if the measured characteristic of a first power source is voltage but the measured characteristic of a second power source is amperage, then power redundancy program 120 will convert the amperage of the second power source into a voltage reading using Ohm's law and a known resistance for the power source, which is included in power source characteristics 125.

If power source characteristics correspond to each other, in units of measure, then a comparison between the two is made by power redundancy program 120 (step 460). The comparison yields a difference (between the characteristics) that can be analyzed using the received threshold value(s) and/or range(s). If the difference exceeds the threshold(s) and/or range(s) associated to the units of measure of the corresponding characteristics (decision step 470, yes branch), then power redundancy program 120 sends a warning indicating that there is not adequate power redundancy (step 480). If the difference does not exceed the threshold(s) and/or range(s) (decision step 470, no branch), then power redundancy program 120 sends a report indicating that there is adequate power redundancy (step 490).

In other embodiments, other information such as the cause of inadequate power redundancy can be included in the warning. For example, the measured difference in voltages of two power sources powering a server computer is 0.005 volts. The minimum allowable threshold difference for voltage from power sources supplied by different circuit/PDUs, is 0.008 volts, and the difference of 0.005 volts from two power sources indicates that the two power sources are sharing a common circuit/PDU, and that there is inadequate power redundancy. In response, power redundancy program 120 sends a warning indicating that there is inadequate power redundancy due to power sources being improperly connected.

Figure 5:
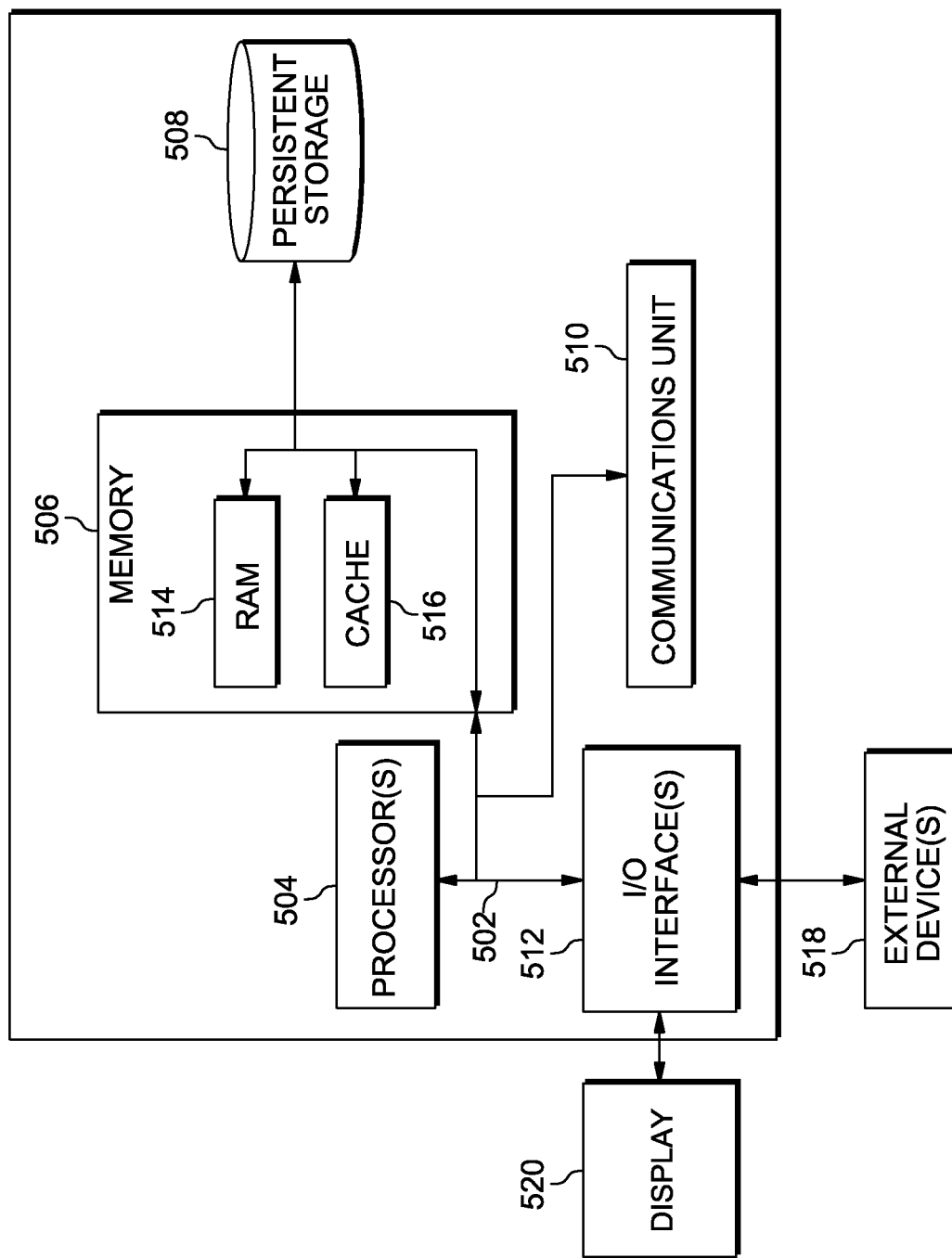
FIG. 5 depicts a block diagram of components of the computing device executing the power redundancy program, in accordance with an embodiment of the present invention.

FIG. 5 depicts a block diagram of computing device 110 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Power redundancy program 120 and power source characteristics 125 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including the resources of network 130 and power system 140. In these examples, communications unit 510 includes one or more network interface cards. Communications unit 510 may provide communications through the use of either or both physical and wireless communications links. Power redundancy program 120 and power source characteristics 125 may be downloaded to persistent storage 508 through communications unit 510.

I/O interface(s) 512 allows for input and output of data with other devices that may be connected to computing device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., power redundancy program 120 and power source characteristics 125 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying the electrical connectivity of power supply units, the method comprising:
 a computer determining a characteristic corresponding to each of a first power supply unit and a second power supply unit, wherein the first and second power supply units are connected to one or more power distribution units and are configured to provide power in a datacenter, wherein the characteristic includes at least one of a current, a resistance, a voltage, a frequency, a phase, and a magnetic field;
 the computer generating a comparison of the characteristic corresponding to the first power supply unit and the second power supply unit, to a threshold value of the characteristic;
 the computer determining if the comparison violates the threshold value of the characteristic; and
 in response to determining the comparison does not violate the threshold value of the characteristic, the computer determining that the first power supply unit and the second power supply unit are connected to a given power distribution unit included in the one or more power distribution units.

2. The method of claim 1, wherein the step of the computer determining if the comparison violates the threshold value of the characteristic includes:
 the first computer determining if the difference between the measured characteristic of the first power supply unit and the second power supply unit exceeds a range.

3. The method of claim 1, wherein the step of the computer generating a comparison of the characteristic corresponding to the first power supply unit and the second power supply unit, to a threshold value of the characteristic includes:
 the computer converting one or both of the characteristic corresponding to the first power supply unit and the second power supply unit to a value that facilitates the determination of whether or not the first power supply unit and the second power supply unit are electrically connected to a given power distribution unit included in the one or more power distribution units.

4. The method of claim 1, wherein the first power supply unit and the second power supply unit provide power to a server computer included in the datacenter.

5. The method of claim 1, wherein the first power supply unit and the second power supply unit are in a server computer chassis.

6. The method of claim 1, wherein the one or more power distribution units includes at least two power distribution units that work in concert with one another to provide redundant electrical power for a server computer.

7. A computer program product for identifying the electrical connectivity of power supply units, the computer program product comprising:
 one or more non-transitory computer-readable storage media and program instructions stored on the one or more non-transitory computer-readable storage media, the program instructions executable by a processor to cause the processor to perform a method comprising:
 determining a characteristic corresponding to each of a first power supply unit and a second power supply unit, wherein the first and second power supply units are connected to one or more power distribution units and are configured to provide power in a datacenter, wherein the characteristic includes at least one of a current, a resistance, a voltage, a frequency, a phase, and a magnetic field;
 generating a comparison of the characteristic corresponding to the first power supply unit and the second power supply unit, to a threshold value of the characteristic;
 determining if the comparison violates the threshold value of the characteristic; and
 in response to determining the comparison does not violate the threshold value of the characteristic, determining that the first power supply unit and the second power supply unit are connected to a given power distribution unit included in the one or more power distribution units.

8. The computer program product claim 7, wherein determining if the comparison violates the threshold value of the characteristic includes:
 determining if the difference between the measured characteristic of the first power supply unit and the second power supply unit exceeds a range.

9. The computer program product claim 7, wherein generating a comparison of the characteristic corresponding to the first power supply unit and the second power supply unit, to a threshold value of the characteristic includes:
converting one or both of the characteristic corresponding to the first power supply unit and the second power supply unit to a value that facilitates the determination of whether or not the first power supply unit and the second power supply unit are electrically connected to a given power distribution unit included in the one or more power distribution units.

10. The computer program product claim 7, wherein the first power supply unit and the second power supply unit provide power to a server computer included in the datacenter.

11. The computer program product claim 7, wherein the first power supply unit and the second power supply unit are in a server computer chassis.

12. The computer program product claim 7, wherein the one or more power distribution units includes at least two power distribution units that work in concert with one another to provide redundant electrical power for a server computer.

13. A computer system for identifying the electrical connectivity of power supply units, the computer system comprising:
one or more computer processors;
one or more computer-readable storage media; and
program instructions stored on the computer-readable storage media for execution by at least one of the one or more processors, the program instructions comprising:
program instructions to determine a characteristic corresponding to each of a first power supply unit and a second power supply unit, wherein the first and second power supply units are connected to one or more power distribution units and are configured to provide power in a datacenter, wherein the characteristic includes at least one of a current, a resistance, a voltage, a frequency, a phase, and a magnetic field;
program instructions to generating a comparison of the characteristic corresponding to the first power supply unit and the second power supply unit, to a threshold value of the characteristic;
program instructions to determining if the comparison violates the threshold value of the characteristic; and
program instructions to, in response to determining the comparison does not violate the threshold value of the characteristic, determine that the first power supply unit and the second power supply unit are connected to a given power distribution unit included in the one or more power distribution units.

14. The computer system of claim 13, wherein the program instructions to determine if the comparison violates the threshold value of the characteristic includes:
program instructions to determine if the difference between the measured characteristic of the first power supply unit and the second power supply unit exceeds a range.

15. The computer system of claim 13, wherein the program instructions to generate a comparison of the characteristic corresponding to the first power supply unit and the second power supply unit, to a threshold value of the characteristic includes:
program instructions to convert one or both of the characteristic corresponding to the first power supply unit and the second power supply unit to a value that facilitates the determination of whether or not the first power supply unit and the second power supply unit are electrically connected to a given power distribution unit included in the one or more power distribution units.

16. The computer system of claim 13, wherein the first power supply unit and the second power supply unit provide power to a server computer included in the datacenter.

17. The computer system of claim 13, wherein the first power supply unit and the second power supply unit are in a server computer chassis.

18. The computer system of claim 13, wherein the one or more power distribution units includes at least two power distribution units that work in concert with one another to provide redundant electrical power for a server computer.

* * * * *